United States Patent
Focazio et al.

(10) Patent No.: US 7,299,234 B2
(45) Date of Patent: Nov. 20, 2007

(54) METHOD AND APPARATUS FOR VALIDATING AND CONFIGURING DATABASE TRANSACTION REQUESTS FROM MULTIPLE CLIENTS

(75) Inventors: Robyn Lee Focazio, Round Rock, TX (US); Kumar Marappan, Round Rock, TX (US); Fabian F. Morgan, Austin, TX (US); Brent Russel Phillips, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 10/756,932

(22) Filed: Jan. 14, 2004

(65) Prior Publication Data

US 2005/0165776 A1    Jul. 28, 2005

(51) Int. Cl.
  *G06F 7/00* (2006.01)
  *G06F 17/00* (2006.01)
(52) U.S. Cl. .................... 707/100; 707/102
(58) Field of Classification Search ........ 707/100–104; 709/229, 223
See application file for complete search history.

(56) References Cited

U.S. PATENT DOCUMENTS

| | | | |
|---|---|---|---|
| 6,356,906 B1 | 3/2002 | Lippert et al. | 707/10 |
| 6,356,907 B1 | 3/2002 | Hopmann | 707/10 |
| 6,418,448 B1 | 7/2002 | Sarkar | 707/104.1 |
| 6,449,620 B1 | 9/2002 | Draper et al. | 707/102 |
| 6,523,040 B1 | 2/2003 | Lo et al. | |
| 6,611,843 B1 | 8/2003 | Jacobs | 707/102 |
| 6,801,915 B1 | 10/2004 | Mack | |
| 2002/0120685 A1* | 8/2002 | Srivastava et al. | 709/203 |
| 2003/0050932 A1 | 3/2003 | Pace et al. | |
| 2004/0024888 A1* | 2/2004 | Davis et al. | 709/229 |
| 2004/0181537 A1 | 9/2004 | Chawla et al. | |
| 2005/0216498 A1* | 9/2005 | Georgalas et al. | 707/102 |

* cited by examiner

*Primary Examiner*—Hosain Alam
*Assistant Examiner*—Shew-Fen Lin
(74) *Attorney, Agent, or Firm*—Duke W. Yee; David A. Mims, Jr.; Lisa L. B. Yociss (57) ABSTRACT

The present invention provides a method, computer program product, and a data processing system for validating and configuring a database transaction request. A first transaction criteria of a plurality of transaction criteria is identified in a singleton in-memory object by reading a client identifier element value specified in a database transaction request. Each of the plurality of transaction criteria is associated with a respective client. Default data for a database path is determined based on the client identifier element value. A database command is generated that includes the default data.

10 Claims, 4 Drawing Sheets

```
702 ─<transaction type = insert>        703              700
         ┌<client_list>                711
  706 ─┘       ┌<user UserID = client_A>
     710 ─┘      ┌<transaction_criteria>       723
        714 ─┘     ┌<criteria1>
           718 ─┘    ┌<required>true</required>
              722 ─┘                        729
                      ┌<path>problem.severity</path>
                 728 ─┘<default></default> ─ 734
                       </criteria1>      743
                 738 ─┌<criteria2>
                      ┌<required> true </required>
                 742 ─┘                    747
                       ┌<path>userID</path>
                 746 ─┘<default></default> ─ 748
                       </criteria2>
                     </transaction_criteria>
            </user>
  750 ─┌<user UserID = client_B> ─ 751
       ┌<transaction_criteria>        763
   754 ─┘  ┌<criteria1>
      758 ─┘  ┌<required>false</required>
         762 ─┘┌<path>problem.severity</path>
         766 ─┘          771
                                767
                <default>3</default> ─ 770
                </criteria1>     779
        774 ─┌<criteria2>
             ┌<required>true</required>
        778 ─┘                    783
              ┌<path>userID</path>
        782 ─┘<default></default> ─ 786
              </criteria2>
            </transaction_criteria>
        </user>
     </client_list>
</transaction>
```

*FIG. 7*

METHOD AND APPARATUS FOR VALIDATING AND CONFIGURING DATABASE TRANSACTION REQUESTS FROM MULTIPLE CLIENTS

BACKGROUND OF THE INVENTION

1. Technical Field

The present invention relates generally to an improved data processing system and in particular to a method and apparatus for validating client access to a network-accessible data store. Still more particularly, the present invention provides a method and apparatus for enabling an interface to validate a transaction request directed to a database system, and for configuring the transaction request based on an identification of the client that issued the transaction request.

2. Description of Related Art

In the field of network database systems, various approaches have been taken by software vendors to provide client validation and access to the database system. The ubiquitous nature of the Internet has resulted in numerous protocols and techniques for enabling client access to network database systems. The extensible markup language has emerged as one of the more popular protocols for describing and sharing data on the Internet.

A data provider hosting a database on the Internet will often allow access to the database by a wide variety of clients. It is frequently desirable to provide different access privileges to the database among various clients. In such a situation, different validation criteria are employed to allow or deny a client access to the database.

A common strategy employed for validating a transaction request is to provide a validation document at the server in the form of an (extensible markup language (XML) document type definition (DTD). However, a different DTD is required for each client that has different validation criteria. Accordingly, a number of DTDs are required to facilitate validation of various clients accessing the database according to different validation criteria. The performance of a network server providing validation services to numerous clients having different access criteria is adversely affected due to the number of files or network input/output calls needed to validate each DTD corresponding to a different client.

It would be advantageous to deploy a single validation object that can be used to provide access to different clients having different access criteria. Moreover, it would be advantageous to provide a singleton in-memory object that facilitates configuration and validation of mandatory fields that vary among transaction requests issued by different clients.

SUMMARY OF THE INVENTION

The present invention provides a method, computer program product, and a data processing system for validating and configuring a database transaction request. A first transaction criteria of a plurality of transaction criteria is identified in a singleton in-memory object by reading a client identifier element value specified in a database transaction request. Each of the plurality of transaction criteria is associated with a respective client. Default data for a database field is determined based on the client identifier element value. A database command is generated that includes the default data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
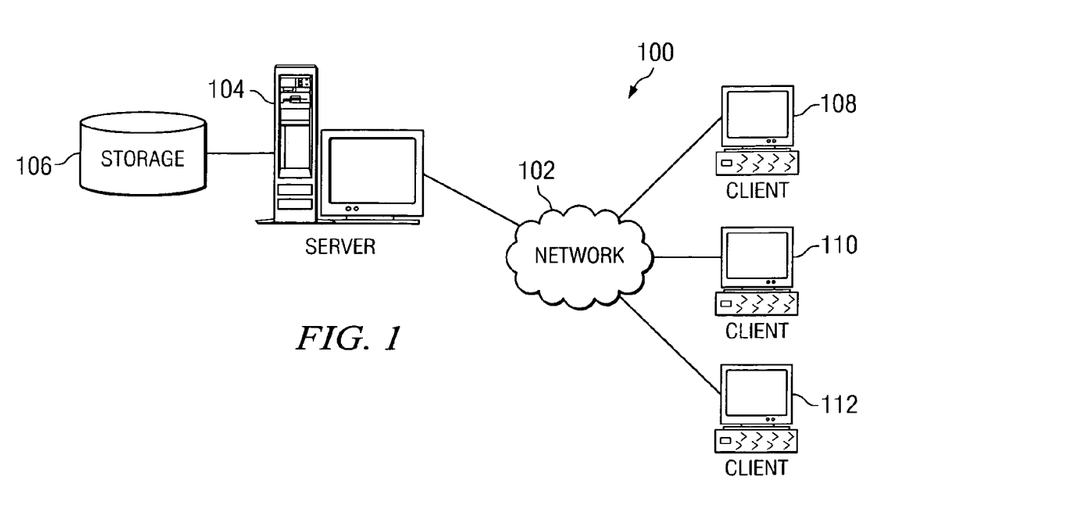
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, a personal computer or network computer. In the depicted example, server 104 provides an interface to a database maintained in storage unit 106. Server 104 validates a transaction request issued by a client that is directed to the database and configures fields of the transaction request according to validation criteria associated with the particular client. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, including thousands of commercial, government, educational and other computer systems that route data and messages of course, network data processing system 100 also may be implemented as a number of different types of networks, such as for example, an intranet, a local area network (LAN), or a wide area network (WAN). FIG. 1 is intended as an example, and not as an architectural limitation for the present invention. Server 104 as illustrated is a web server, also referred to as an HTTP server, and includes server software that processes XML-formatted database transaction requests. Server 104 includes software that utilizes a singleton in-memory object for validating and configuring transaction requests submitted by clients 108, 110, and 112 that are directed to the database maintained in storage unit 106. The connection between client and server is usually broken after the requested document or file has been served. HTTP servers are used on Web and Intranet sites.

Figure 2:
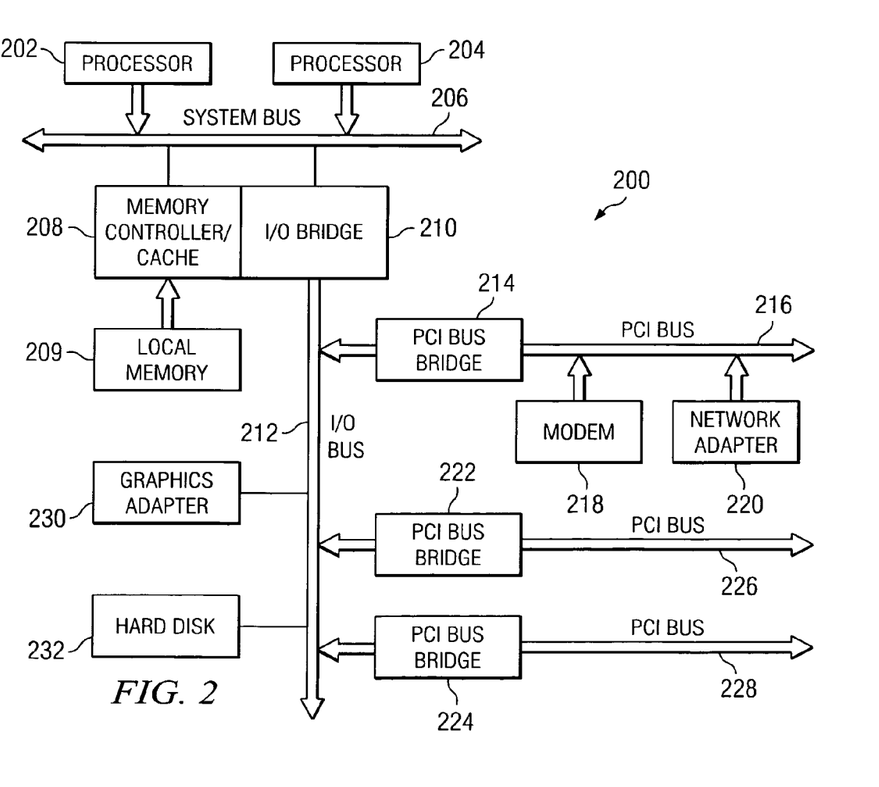
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 is an example of a computer that may be used to provide a transaction request interface to the database maintained in storage unit 106 and to validate and configure transaction requests submitted by clients 108, 110, and 112. Data processing system 200 includes software that utilizes a Java bean marshalled from an XML validation document. The XML validation document defines transaction request criteria for various clients 108, 110, and 112 and facilitates configuration of requisite fields of the transaction request. The transaction request validation and configuration provided by the server is client dependent and enables assignment of default values on a client-by-client basis. In the illustrative examples, an XML-formatted document communicated to data processing system 200 from a client, such as client 108, defines a database transaction request. The transaction request includes a client identifier and various fields that define the particular database transaction type and attributes of the transaction request.

Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108, 110 and 112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
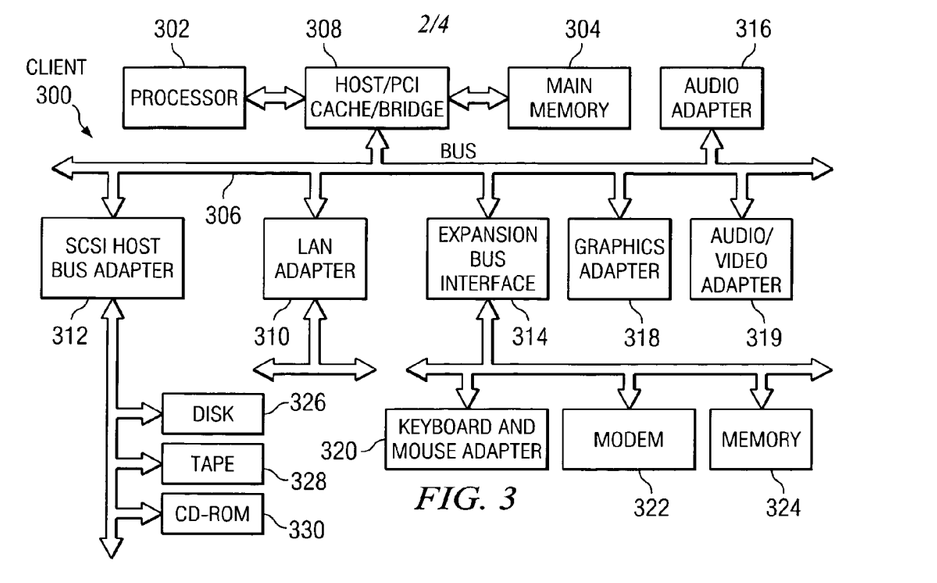
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer, such as client 108 in FIG. 1, which may be used for submitting a database transaction request directed to the database maintained in storage unit 106. More particularly, data processing system 300 submits an XML-formatted database transaction request that includes a client identifier and defines the desired database transaction type and various attributes of the transaction request.

Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Graphics adapter 318 drives a display device 107 that provides the computer interface, or GUI, for displaying handwritten characters as supplied by the user. Expansion bus interface 314 provides a connection for a keyboard and mouse adapter 320, modem 322, and additional memory 324. A pointer device such as mouse 109 is connected with adapter 320 and enables supply of pointer input to system 300 by a user. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Data processing system 300 runs a web browser or other client application adapted to generate an XML-formatted transaction request and communicates the transaction request to data processing system 200. Accordingly, the browser executed by data processing system 300 may be implemented as any one of various well known Java enabled web browsers such as Microsoft Explorer, Netscape Navigator, or the like.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
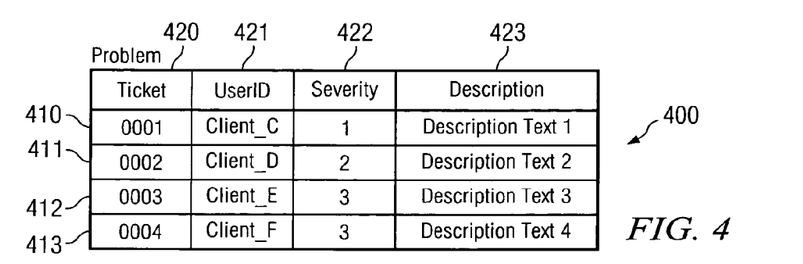
FIG. 4 is a diagrammatic illustration of a database table that is accessible by clients in accordance with a preferred embodiment of the present invention.

FIG. 4 is a diagrammatic illustration of database table 400 maintained in storage unit 106 in FIG. 1 that is accessible by clients 108, 110, and 112 in FIG. 1. Table 400 consists of records 410-413 that include respective data elements in fields 420-423. Table 400 has a label, or identifier, assigned thereto. In the present example, table 400 has a label of "Problem." Fields 420-423 have a respective label, or identifier, that facilitates insertion, deletion, querying, or other data operations or manipulations of table 400. In the illustrative example, fields 420-423 have respective labels of "Ticket", "UserID", "Severity", and "Description." Fields 420-423 contain respective data elements of a common data type. The data elements of field 420 are unique and comprise a key value for identifying a particular record. Four exemplary records are contained in table 400.

Table 400 is representative of a database used for maintaining help desk problem descriptions and status information. Clients 108, 110, and 112 in FIG. 1 may access table 400 for retrieving, inserting, deleting, or modifying information in one or more of the records. Transaction requests issued by clients 108, 110 and 112 are formatted in a common format and are communicated to data processing system 200. In a preferred embodiment of the present invention, transaction requests issued by clients 108, 110, and 112 consist of XML-formatted documents having transaction request fields that consist of XML elements defining the transaction type and attributes of the transaction request.

Figure 5:
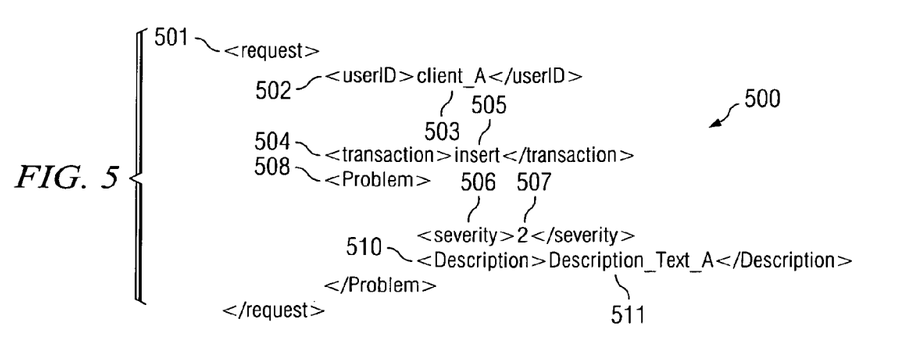
FIG. 5 is an exemplary transaction request issued by a client in accordance with a preferred embodiment of the present invention.

FIG. 5 is an exemplary transaction request 500 issued by a client, such as client 108 of FIG. 1, that is communicated to data processing system 200. Transaction request 500 is an XML-formatted document that includes a user identifier (userID) and various transaction request attributes. For purposes of discussion, assume transaction request 500 is issued by client 108 having a userID of client_A.

In the illustrative example, the transaction request is delineated with request element 501. Transaction request 500 includes userID element 502 including value 503 consisting of a text element of "client_A". A transaction type is specified by transaction element 504 including value 505 consisting of a text element of "insert". A database field target is specified by problem element 508. Problem element 508 identifies table 400 as the database target to which transaction request 500 is directed. Problem element 508 includes elements specifying particular field targets and values. In the illustrative example, severity element 506 has a value 507 of "2". Additionally, problem element 508 includes description element 510 having value 511 of "Description_Text_A".

Thus, transaction request 500 is representative of a transaction request to insert a record in table 400. Particularly, transaction request 500 specifies a value of "2" to be inserted in Severity field 422 and a text string of "Description_Text_A" to be inserted in Description field 423 of the inserted record.

Figure 6:
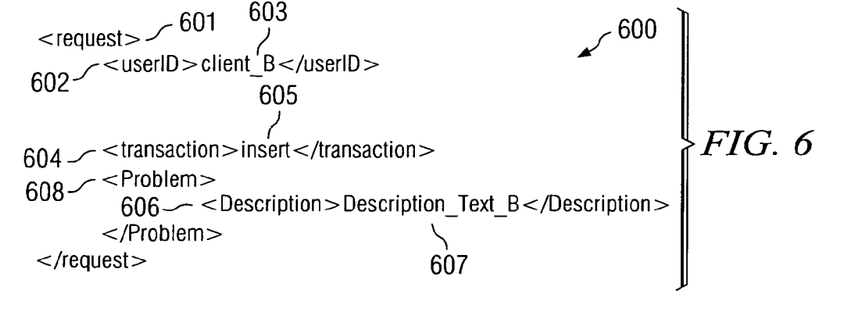
FIG. 6 is an exemplary transaction request issued by a client that does not include non-required data in accordance with a preferred embodiment of the present invention.

FIG. 6 is an exemplary transaction request 600 issued by a client, such as client 110 of FIG. 1, that does not include non-required data and that is communicated to data processing system 200 in FIG. 2 in accordance with a preferred embodiment of the present invention. For purposes of discussion, assume transaction request 600 is issued by client 110 having a user ID of client_B. Transaction request 600 includes userID element 602 including value 603 consisting of a text element of "client_B". A transaction type is specified by transaction element 604 including value 605 consisting of a text element of "insert". A database field target is specified by problem element 608. Problem element 608 identifies table 400 as the database target to which transaction request 600 is directed. Problem element 608 includes elements specifying particular field targets and values. In the illustrative example, description element 606 has value 607 of "Description_Text_B," and transaction request 600 does not include an element that specifies a value for the severity field of the targeted table.

Thus, transaction request 600 is representative of a transaction request to insert a record in table 400 with a text string of "Description_Text_B" to be inserted in Description field 423 of the inserted record.

Figure 7:
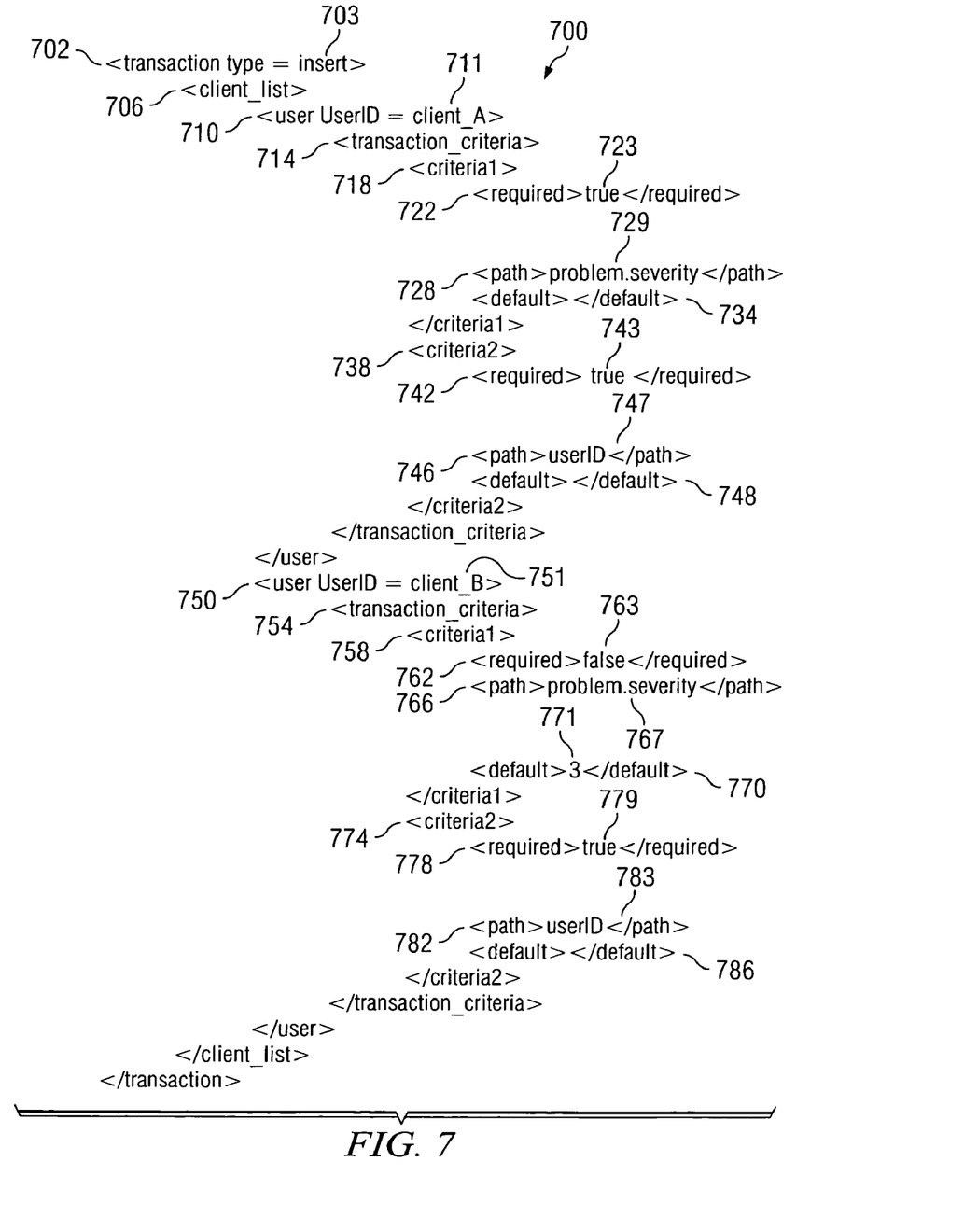
FIG. 7 is a portion of an exemplary validation document from which a validation object is derived that is used by the server for validating and configuring database transaction requests as implemented according to a preferred embodiment of the present invention.

FIG. 7 is a portion of an exemplary validation document 700 from which a validation object is derived that is used by the server for validating and configuring database transaction requests as implemented according to a preferred embodiment of the present invention. Exemplary validation document 700 is an XML-formatted document although other document formats may be suitably substituted. Exemplary validation document 700 consists of various XML elements that describe access criteria for different clients. In particular, a client validation criteria consists of XML elements delineated by a criteria element.

In the illustrative example, exemplary validation document 700 includes user identifiers implemented as tag attributes 711 and 751 of user elements 710 and 750. Tag attribute 711 has a value of "client_A" and tag attribute 751 has a value of "client_B". Validation criteria for client_A are included within user element 710. Likewise, validation criteria for client_B are included within user element 750. Two exemplary transaction criteria are defined for each of the clients in exemplary validation document 700.

Each criteria is defined by three child elements, namely a required element, a path element, and a default element. The required element denotes whether the transaction request must include data for the path specified by the path element of the respective criteria. The default element may specify a default value if the required element indicates the path data is not required. A default value is used by the validation algorithm to configure a database command if the path data is not provided by the transaction request and the required element indicates the path data is not required. If a required element specifies that the transaction request must include data for the path identified by the path element, an error, or exception, is generated in the event that the transaction request does not include the required data.

A first transaction criteria for client_A is delineated by criteria1 element 718, and a second transaction criteria is delineated by criteria2 element 738. Criteria1 element 718 includes required element 722 having value 723 of "true," thus indicating that transaction request 500 must include data for the path specified by path element 728. Path element 728 includes value 729 of "Problem.Severity." In the illustrative examples, a database path is specified in dot notation. For example, "Problem.Severity" indicates a database path consisting of table 400 labeled "Problem" and field 422 labeled "Severity." It should be noted that a path specified in a client transaction request may or may not form a literal database path. For example, the path specified by problem and severity elements 508 and 506 of transaction request 500 may be mapped by, for example, column maps included within the configuration object or by another application adapted to map a client request to a particular database path. As referred to herein, a database path may refer to a literal database path or to a path that is mapped to a particular database target. Default element 734 is nulled. The second criteria of client_A includes required element 742 having value 743 of "true" that indicates transaction request 500 must include data for a path "userID" specified by value 747 of path element 746. Default element 748 is nulled.

First and second transaction criteria of client_B are delineated by criteria1 element 758 and criteria2 element 774, respectively. Criteria1 element 758 includes required element 762 having value 763 of "false" thus indicating that transaction request 600 does not have to include data for the path "Problem.Severity" specified by value 767 of path element 766. A default value 771 of "3" is included within default element 770. The second criteria of client_B includes a required element 778 having a value 779 of "true" that indicates transaction request 600 must include data for the path "userID" specified by value 783 of path element 782. Default element 786 is nulled.

Preferably, exemplary validation document 700 is used as a source file that will be marshalled into a validation object that may be loaded into memory 209 of data processing system 200. For example, exemplary validation document 700 may be processed with a Java Architecture for XML binding application to generate a validation object, such as a Java bean. The validation object includes computer-readable logic corresponding to the client criteria of exemplary validation document 700 and is loaded into the server memory as a singleton in-memory object. Accordingly, transaction requests from multiple clients may be validated and configured with the singleton in-memory validation object. Moreover, the validation object may be used to configure an SQL command including default path data for path data that is not specified in the transaction request.

Data processing system 200 in FIG. 2 includes an XML-parser as a subroutine of the validation algorithm for evaluating the transaction request content of transaction requests 500 in FIG. 5 and 600 in FIG. 6 and comparing the transaction request content with the criteria defined in the validation object. The validation algorithm generates an exception and communicates the exception to the client when the transaction request fails any corresponding client criteria defined in the validation object when no default value is specified for the particular criteria. The validation algorithm generates an SQL command for submission to a database backend that performs SQL transactions with table 400 in FIG. 4 maintained in storage unit 106 in FIG. 1 for any transaction request determined to conform with the validation object. A transaction request not including non-required data is validated by the validation algorithm. An SQL command is then generated using the default value for the non-required data.

Figure 8:
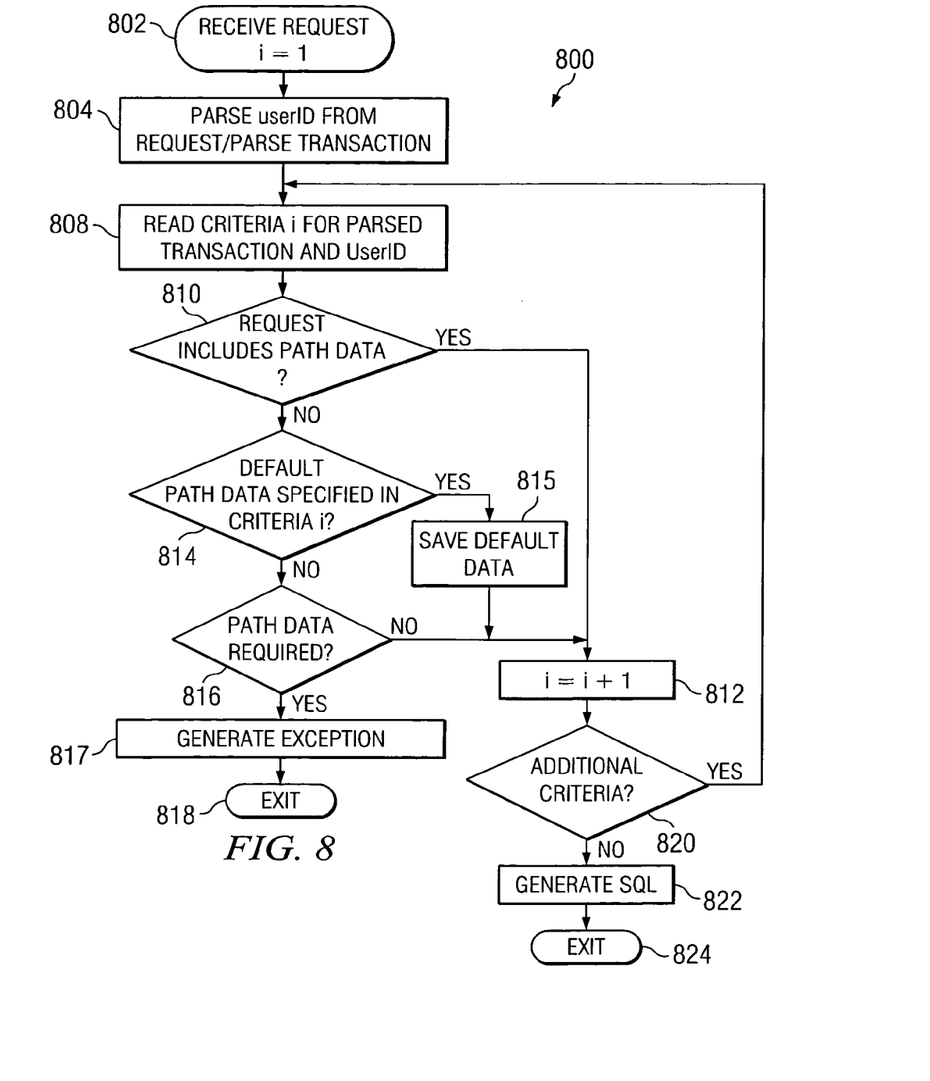
FIG. 8 is a flowchart showing the validation algorithm processing performed by a server according to a preferred embodiment of the present invention.

FIG. 8 is a flowchart 800 showing the validation algorithm processing performed by data processing system 200 according to a preferred embodiment of the present invention. Data processing system 200 receives a transaction request and a criteria index counter i is initialized to 1 (step 802). The userID and transaction type is parsed from the transaction request (step 804). A criteria i for the userID and transaction parsed from the transaction request is read from the validation object (step 808). An evaluation is made to determine if the transaction request includes the path data specified in criteria i (step 810). The validation algorithm validates the request for criteria i and proceeds to increment the criteria index counter i if the transaction request includes the path data specified in criteria i (step 812).

Alternatively, an evaluation is made to determine if default data is specified in criteria i if the path data is not included in the transaction request (step 814). The validation algorithm validates the request if default data is specified and saves the default data (step 815). The validation algorithm proceeds to increment the criteria index counter (step 812) after saving the default data. If, however, an evaluation of criteria i indicates no default data is specified, the validation algorithm proceeds to evaluate whether the path data is required (step 816). If the path data is required, an exception is generated (step 817) and the validation algorithm exits (step 818). Alternatively, the validation algorithm validates the request against the current criteria i and proceeds to increment the criteria index counter i (step 812) if the path data is not required for request validation.

Thus, a request may be validated against a particular criteria i by: including data for a path specified by criteria i; excluding path data specified by criteria i that has default data specified for the path; or by excluding data for a path that is specified as non-required by criteria i. The request is validated by the validation algorithm if a successful validation is made for each criteria of the validation object for the particular client and transaction type.

After validating a request against the current criteria i, the validation algorithm proceeds to determine if an additional criteria remains for examination to validate the transaction request (step 820). The validation algorithm returns back to step 808 to read the remaining criteria if an additional criteria remains for evaluation. Otherwise, the transaction request is validated and an SQL command is generated according to the transaction request and any saved default path data identified for proper configuration of the transaction request (step 822). The SQL command may then be communicated to the database system for processing and the validation algorithm exits (step 824).

With reference now back to FIGS. 4-8, the present invention may better be understood with descriptions of client transaction request processing in accordance with a preferred embodiment of the invention. Transaction request 500 in FIG. 5 is communicated from client 108 in FIG. 1 to data processing system 200 in FIG. 2. The XML-parser subroutine of the validation algorithm executed by data processing system 200 is adapted to parse data elements from transaction request 500 and compare the data element values with criteria defined in the validation object.

Values 503 and 505 of respective userID element 502 and transaction element 504 are parsed from transaction request 500. First and second criteria defined in the validation object are identified for client 108 by matching the userID and transaction values parsed from transaction request 500 with attribute values 711 and 703 of user element 710 and transaction element 702, respectively. Transaction request 500 is then evaluated against the criteria defined in the validation object. Criteria1 element 718 specifies that data for the path "Problem.Severity" must be specified in transaction request 500. The validation algorithm confirms that transaction request 500 includes data for the required database path, namely the value of "2". Criteria2 element 738 specifies that data for the path "userID" must be specified. The validation algorithm confirms that transaction request 500 includes data for the required database path, namely a user ID value of "client_A." An SQL command is then generated conforming to transaction request 500. The following exemplary SQL command is generated by the validation algorithm after validation of transaction request 500:

insert into Problem
(UserID, Severity, Description)
values ('client_A', '2', 'Description_Text_A')

The SQL insert command is then communicated to the database backend and processed accordingly.

Assume now data processing system 200 receives transaction request 600 from client 110. Values 603 and 605 of userID element 602 and transaction element 604 are parsed from transaction request 600. First and second criteria for client 110 defined in the validation object are identified by matching the userID and transaction values parsed from transaction request 600 with attribute values 751 and 703 of user element 750 and transaction element 702, respectively, of the validation object. Transaction request 600 is then evaluated against the identified criteria. Criteria1 element 758 indicates that a value for the path "Problem.Severity" is not required to be specified in transaction request 600. The validation algorithm evaluates transaction request 600 for path data for the path identified by criteria1 element 758. The validation algorithm determines that transaction request 600 does not include data for the path "Problem.Severity" identified by criteria1 element 758. The validation algorithm then evaluates criteria1 element 758 to determine if default data is specified for the path. In the present example, default value 771 of "3" is specified for the path and the validation algorithm proceeds to evaluate transaction request 600 against the second criteria.

Criteria2 element 774 specifies that data for the path "userID" must be specified. The validation algorithm confirms that transaction request 600 includes data for the required database path, namely a user ID value of "client_B." An SQL command is then generated for transaction request 600. In the particular example, the validation algorithm configures the SQL command according to the data included in transaction request 600 and default data identified for the database path "Problem.Severity." The following SQL command is generated by the validation algorithm after validation of transaction request 600:

insert into Problem
(UserID, Severity, Description)
values ('client_B', '3', 'Description_Text_B')

The SQL command generated by the validation algorithm includes transaction request data, for example the data targeted for insertion in Description field 423, that is parsed from transaction request 600 and default data identified for the database path "Problem.Severity" that is not included in transaction request 600.

As described, the present invention provides a singleton in-memory object used to validate and configure database transaction requests from clients having different validation criteria. A validation algorithm configures an SQL command according to default data specified for database path data not included in a transaction request. Multiple clients having different validation criteria are validated and configured with a singleton in-memory validation object.

It is important to note that while the present invention has been described in the context of a fully functioning data processing system, those of ordinary skill in the art will appreciate that the processes of the present invention are capable of being distributed in the form of a computer readable medium of instructions and a variety of forms. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for validating transaction requests from a plurality of clients to access a database, the method comprising the computer implemented steps of:

providing an interface to validate transaction requests to access a database, using a plurality of validation criteria, from said plurality of clients having different requirements for said validation criteria, said interface in a singleton in-memory object;

using said different requirements to validate said transaction requests from said plurality of clients;

said interface including:

said database command including a plurality of mandatory fields;

associating a first one of said plurality of validation criteria with one of said plurality of mandatory fields, wherein data that is received for said first one of said plurality of validation criteria is included in said one of a plurality of mandatory fields;

defining a first requirement for validating transaction requests from first ones of said plurality of clients using said first one of said plurality of validation criteria, said first requirement requiring data to be included in said transaction requests from said first ones of said plurality of clients for said first one of said plurality of validation criteria;

defining a second requirement for validating transaction requests from second ones of said plurality of clients using said first one of said plurality of validation criteria, said second requirement not requiring data to be included in said transaction requests from said second ones of said plurality of clients for said first one of said plurality of validation criteria;

in response to receiving a first transaction request from one of said first ones of said plurality of clients: validating said first transaction request responsive to said first transaction request including first data for said first one of said plurality of validation criteria; and generating a database command that includes said first data in said one of said plurality of mandatory fields after said first transaction request has been validated;

in response to receiving a second transaction request from one of said second ones of said plurality of clients: validating said second transaction request determining default data that has been specified for said second ones of said plurality of clients to use for said first one of said plurality of validation criteria response to said second transaction request not including said second data, and generating a database command that includes said default data in said one of said plurality of mandatory fields after said second transaction request has been validated; and transforming, by a data processing system, said transaction requests into a database command by generating said database command in response to validated transaction requests, wherein said database command is generated in response to a validated transaction request regardless of which one of said plurality of clients sent said validated transaction request.

2. The method of claim 1, further comprising:

associating a second one of said plurality of validation criteria with a second one of said plurality of mandatory fields;

defining a third requirement for validating transaction requests from said first ones of said plurality of clients using said second one of said plurality of validation criteria, said third requirement not requiring data in said transaction requests from said first ones of said plurality of clients for said second one of said plurality of validation criteria; and in response to receiving said first transaction request: validating said first transaction request if said first transaction request includes said first data and regardless of whether said first transaction request includes second data for said second one of said plurality of validation criteria; if said first transaction request does not include data for said second one of said plurality of validation criteria, determining second default data that has been specified for said first ones of said plurality of clients to use for said second one of said plurality of validation criteria; and if said first transaction request has been validated, generating a database command that includes said first data in said one of said plurality of mandatory fields and said second default data in said second one of said plurality of mandatory fields.

3. The method of claim 1, further including:

in response to receiving said first transaction request: generating an exception if said first transaction request does not include said first data, wherein said first transaction request is not validated.

4. The method of claim 1, wherein the database command is a structured query language command, and wherein each one of said transaction requests is included in an extensible markup language document.

5. A computer program product in a data processing system comprising:

a computer readable medium including instructions for validating transaction requests from a plurality of clients, said computer program product including:

instructions for providing an interface to validate said transaction requests to access a database, using a plurality of validation criteria, from said plurality of clients having different requirements for said plurality of validation criteria, said interface in a singleton in-memory object; and instructions for using said different requirements to validate said transaction requests from said plurality of clients; and said interface including:

said database command including a plurality of mandatory fields;

instructions for associating a first one of said plurality of validation criteria with one of a plurality of mandatory fields of said database command, wherein data that is received for said first one of said plurality of validation criteria is included in said one of said plurality of mandatory fields;

instructions for defining a first requirement for validating transaction requests from first ones of said plurality of clients using said first one of said plurality of validation criteria, said first requirement requiring data to be included in said transaction requests from said first ones of said plurality of clients for said first one of said plurality of validation criteria;

instructions for defining a second requirement for validating transaction requests from second ones of said plurality of clients using said first one of said plurality of validation criteria, said second requirement not requiring data to be included in said transaction requests from said second ones of said plurality of clients for said first one of said plurality of validation criteria;

in response to receiving a first transaction request from one of said first ones of said plurality of clients: instructions for validating said first transaction request responsive to said first transaction request including first data for said first one of said plurality of validation criteria; and generating a database command that includes said first data in said one of said plurality of mandatory fields after said first transaction request has been validated;

in response to receiving a second transaction request from one of said second ones of said plurality of clients: instructions for validating said second transaction request, determining default data that has been specified for said second ones of said plurality of clients to use for said first one of said plurality of validation criteria responsive to said second transaction request does not include said second data, and generating a database command that includes said default data in said one of said plurality of mandatory fields after said second transaction request has been validated; and instructions for transforming, by the data processing system, said transaction requests into a database command by generating said database command in response to validated transaction requests, wherein said database command is generated in response to a validated transaction request regardless of which one of said plurality of clients sent said validated transaction request.

6. The computer program product of claim 5, further comprising:

instructions for associating a second one of said plurality of validation criteria with a second one of said plurality of mandatory fields;

instructions for defining a third requirement for validating transaction requests from said first ones of said plurality of clients using said second one of said plurality of validation criteria, said third requirement not requiring data in said transaction requests from said first ones of said plurality of clients for said second one of said plurality of validation criteria; and in response to receiving said first transaction request: instructions for validating said first transaction request if said first transaction request includes said first data and regardless of whether said first transaction request includes second data for said second one of said plurality of validation criteria; if said first transaction request does not include data for said second one of said plurality of validation criteria, determining second default data that has been specified for said first ones of said plurality of clients to use for said second one of said plurality of validation criteria; and if said first transaction request has been validated, generating a database command that includes said first data in said one of said plurality of mandatory fields and said second default data in said second one of said plurality of mandatory fields.

7. The computer program product of claim 5, wherein the database command is a structured query language command, and wherein each one of the transaction requests is an extensible markup language document.

8. A data processing system for validating transaction requests from a plurality of clients, comprising:
- a memory that contains a set of instructions and a singleton in-memory object; and
- a processing unit, responsive to execution of the set of instructions, for:
- providing an interface to validate transaction requests to access a database, using a plurality of validation criteria, from said plurality of clients having different requirements for said plurality of validation criteria, said interface in a singleton in-memory object;
- using said different requirements to validate said transaction requests from said plurality of clients;
- said interface including:
- said database command including a plurality of mandatory fields;
- associating a first one of said plurality of validation criteria with one of said plurality of mandatory fields, wherein data that is received for said first one of said plurality of validation criteria is included in said one of said plurality of mandatory fields;
- defining a first requirement for validating transaction requests from first ones of said plurality of clients using said first one of said plurality of validation criteria, said first requirement requiring data to be included in said transaction requests from said first ones of said plurality of clients for said first one of said plurality of validation criteria;
- defining a second requirement for validating transaction requests from second ones of said plurality of clients using said first one of said plurality of validation criteria, said second requirement not requiring data to be included in said transaction requests from said second ones of said plurality of clients for said first one of said plurality of validation criteria;
- in response to receiving a first transaction request from one of said first ones of said plurality of clients: validating said first transaction request responsive to said first transaction request including first data for said first one of said plurality of validation criteria; and generating a database command that includes said first data in said one of said plurality of mandatory fields after said first transaction request has been validated;
- in response to receiving a second transaction request from one of said second ones of said plurality of clients: validating said second transaction request, determining default data that has been specified for said second ones of said plurality of clients to use for said first one of said plurality of validation criteria responsive to said second transaction request not including said second data, and generating a database command that includes said default data in said one of said plurality of mandatory fields after said second transaction request has been validated; and
- said data processing system transforming said transaction requests into a database command by generating said database command in response to validated transaction requests, wherein said database command is generated in response to a validated transaction request regardless of which one of said plurality of clients sent said validated transaction request.

9. The data processing system according to claim 8, further comprising said processing unit, responsive to execution of the set of instructions, for:
- associating a second one of said plurality of validation criteria with a second one of said plurality of mandatory fields;
- defining a third requirement for validating transaction requests from said first ones of said plurality of clients using said second one of said plurality of validation criteria, said third requirement not requiring data in said transaction requests from said first ones of said plurality of clients for said second one of said plurality of validation criteria; and
- in response to receiving said first transaction request: validating said first transaction request if said first transaction request includes said first data and regardless of whether said first transaction request includes second data for said second one of said plurality of validation criteria; if said first transaction request does not include data for said second one of said plurality of validation criteria, determining second default data that has been specified for said first ones of said plurality of clients to use for said second one of said plurality of validation criteria; and if said first transaction request has been validated, generating a database command that includes said first data in said one of said plurality of mandatory fields and said second default data in said second one of said plurality of mandatory fields.

10. The data processing system according to claim 8, further comprising said processing unit, responsive to execution of the set of instructions, for:
- in response to receiving said first transaction request from said one of said first ones of said plurality of clients: generating an exception if said first transaction request does not include said first data, wherein said first transaction request is not validated.

* * * * *